United States Patent
Fischer et al.

(10) Patent No.: US 9,732,308 B2
(45) Date of Patent: *Aug. 15, 2017

(54) POLYESTERS

(71) Applicant: CLARIANT INTERNATIONAL LTD, Muttenz (CH)

(72) Inventors: Dirk Fischer, Klein-Winternheim (DE); Thomas Lindner, Wiesbaden (DE)

(73) Assignee: Clariant International Ltd., Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/418,681

(22) PCT Filed: Jul. 24, 2013

(86) PCT No.: PCT/EP2013/002194
§ 371 (c)(1),
(2) Date: Jan. 30, 2015

(87) PCT Pub. No.: WO2014/019658
PCT Pub. Date: Feb. 6, 2014

(65) Prior Publication Data
US 2015/0166938 A1 Jun. 18, 2015

(30) Foreign Application Priority Data
Jul. 31, 2012 (EP) .................... 12005549

(51) Int. Cl.
C07C 69/76 (2006.01)
C11D 3/37 (2006.01)
C08G 63/672 (2006.01)
C11D 3/00 (2006.01)
C08G 63/183 (2006.01)
C11D 11/00 (2006.01)

(52) U.S. Cl.
CPC .......... *C11D 3/3715* (2013.01); *C08G 63/183* (2013.01); *C08G 63/672* (2013.01); *C11D 3/0036* (2013.01); *C11D 11/0017* (2013.01)

(58) Field of Classification Search
CPC ................ C08G 63/183; C08G 63/672; C11D 11/0017; C11D 3/0036; C11D 3/3715
See application file for complete search history.

(56) References Cited

U.S. PATENT DOCUMENTS

| | | | |
|---|---|---|---|
| 4,759,876 | A | 7/1988 | Crossin |
| 6,153,723 | A | 11/2000 | Lang et al. |
| 9,365,806 | B2 | 6/2016 | Carswell et al. |
| 2009/0036641 | A1 | 2/2009 | Lang et al. |
| 2010/0098655 | A1 | 4/2010 | Lang et al. |
| 2011/0095109 | A1 | 4/2011 | Borchers et al. |
| 2011/0098418 | A1 | 4/2011 | Morschhaeuser et al. |
| 2015/0203630 | A1 | 7/2015 | Fischer et al. |
| 2015/0218491 | A1 | 8/2015 | Morschhaeuser et al. |
| 2015/0240029 | A1 | 8/2015 | Fischer et al. |

FOREIGN PATENT DOCUMENTS

| | | |
|---|---|---|
| DE | 102007005532 | 8/2008 |
| DE | 102007013217 | 9/2008 |
| EP | 0185427 | 6/1986 |
| EP | 0523956 | 1/1993 |
| EP | 0964015 | 12/1999 |
| EP | 2135931 | 12/2009 |
| EP | 2692842 | 2/2014 |
| GB | 1466639 | 3/1977 |
| WO | WO 01/58980 | 8/2001 |
| WO | WO 2007079850 | 7/2007 |

(Continued)

OTHER PUBLICATIONS 933 2005.*
Written Opinion of the International Searching Authoirty for PCT/EP2013/002194, dated Sep. 19, 2013.
Machine translation of DE 102007013217, Sep. 18, 2008.
Non-final Office Action for U.S. Appl. No. 14/417,410 dated Sep. 15, 2015.
Search Report in EP12178620 dated Nov. 21, 2012.
Written Opinion in EP12178620 dated Nov. 21, 2012.
Search Report in PCTEP2013065583 dated Nov. 12, 2013.
IPRP2 in PCTEP2013065583 dated Jul. 17, 2014.
Written Opinion in PCTEP2013065583 dated Nov. 12, 2013.
Written Opinion in PCTEP2013063967 dated Sep. 17, 2013.
Search Report in PCTEP2013063967 dated Sep. 17, 2013.
International Search Report for PCT/EP2013/002194, dated Sep. 20, 2013.

*Primary Examiner* — Yevegeny Valenrod
*Assistant Examiner* — Blaine G Doletski
(74) *Attorney, Agent, or Firm* — Tod A. Waldrop

(57) ABSTRACT

Polyesters according to the following formula (I) are described

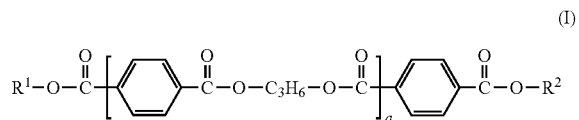

wherein
$R^1$ and $R^2$ independently of one another are $X$—$(OC_2H_4)_n$—$(OC_3H_6)_m$ wherein X is $C_{1-4}$ alkyl, the —$(OC_2H_4)$— groups and the —$(OC_3H_6)$— groups are arranged blockwise and the block consisting of the —$(OC_3H_6)$— groups is bound to a COO group or are HO—$(C_3H_6)$,
n is based on a molar average a number of from 12 to 120,
m is based on a molar average a number of from 1 to 10, and
a is based on a molar average a number of from 4 to 9.
The inventive polyesters have an advantageous stability in alkaline environment, possess a beneficial solubility and advantageously are clearly soluble in alkaline compositions such as alkaline heavy duty washing liquids and also possess advantageous soil release properties.

12 Claims, No Drawings

(56) References Cited

FOREIGN PATENT DOCUMENTS

| WO | WO 2009138177 |   | 11/2009 |
|----|---------------|---|---------|
| WO | WO 2009153184 |   | 12/2009 |
| WO | WO2011000158  | * | 1/2011  |
| WO | WO 2011000158 |   | 1/2011  |
| WO | WO2012104159  | * | 8/2012  |
| WO | WO 2014019792 |   | 2/2014  |

* cited by examiner

POLYESTERS

The invention relates to new polyesters and a process for their preparation. The polyesters are e.g. useful as soil release agents in laundry detergent and fabric care products.

The term "soil release agent" is applied to materials that modify the fabric surface minimizing the subsequent soiling and making the cleaning of the fabric easier on further washing cycles.

Laundry detergent compositions containing polyesters have been widely disclosed in the art.

DE 10 2007 013 217 A1 and WO 2007/079850 A1 disclose anionic polyesters that may be used as soil release components in washing and cleaning compositions.

DE 10 2007 005 532 A1 describes aqueous formulations of soil release oligo- and polyesters with a low viscosity. The aqueous formulations may e.g. be used in washing and cleaning compositions.

EP 0 964 015 A1 discloses soil release oligoesters that may be used as soil release polymers in detergents and that are prepared using polyols comprising 3 to 6 hydroxyl groups.

EP 1 661 933 A1 is directed to at room temperature flowable, amphiphilic and nonionic oligoesters prepared by reacting dicarboxylic acid compounds, polyol compounds and water-soluble alkylene oxide adducts and their use as additive in washing and cleaning compositions.

However, many of the polyesters described in the prior art are in need of improved stability in an alkaline environment. Especially in alkaline heavy duty washing liquids polyesters often show turbidity upon incorporation and by alkaline hydrolysis thereby also losing soil release power.

Therefore, it was the object of the present invention to provide new polyesters which have an advantageous stability in alkaline environment, possess a beneficial solubility and advantageously are clearly soluble in alkaline compositions such as alkaline heavy duty washing liquids and also possess advantageous soil release properties.

Surprisingly this object is solved by polyesters according to the following formula (I)

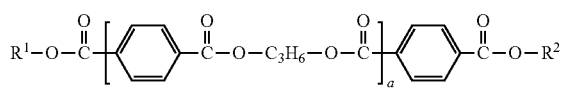

wherein
R¹ and R² independently of one another are X—(OC₂H₄)ₙ—(OC₃H₆)ₘ wherein X is $C_{1-4}$ alkyl and preferably methyl, the —(OC₂H₄) groups and the —(OC₃H₆) groups are arranged blockwise and the block consisting of the —(OC₃H₆) groups is bound to a COO group or are HO—(C₃H₆), and preferably are independently of one another X—(OC₂H₄)ₙ—(OC₃H₆)ₘ,
n is based on a molar average a number of from 12 to 120 and preferably of from 40 to 50,
m is based on a molar average a number of from 1 to 10 and preferably of from 1 to 7, and
a is based on a molar average a number of from 4 to 9.

Therefore, a subject matter of the present invention are polyesters according to the following formula (I)

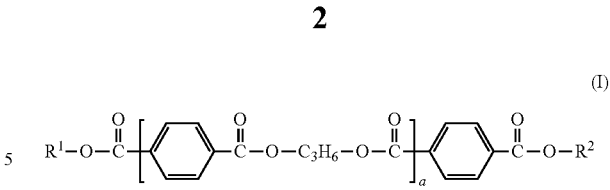

wherein
R¹ and R² independently of one another are X—(OC₂H₄)ₙ—(OC₃H₆)ₘ wherein X is $C_{1-4}$ alkyl and preferably methyl, the —(OC₂H₄) groups and the —(OC₃H₆) groups are arranged blockwise and the block consisting of the —(OC₃H₆) groups is bound to a COO group or are HO—(C₃H₆), and preferably are independently of one another X—(OC₂H₄)ₙ—(OC₃H₆)ₘ,
n is based on a molar average a number of from 12 to 120 and preferably of from 40 to 50,
m is based on a molar average a number of from 1 to 10 and preferably of from 1 to 7, and
a is based on a molar average a number of from 4 to 9.

In the inventive polyesters group "X" is $C_{1-4}$ alkyl and preferably is methyl.

In a preferred embodiment of the invention the inventive polyesters are according to the following formula (I)

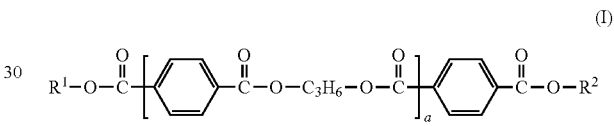

wherein
R¹ and R² independently of one another are H₃C—(OC₂H₄)ₙ—(OC₃H₆)ₘ wherein the —(OC₂H₄) groups and the —(OC₃H₆) groups are arranged blockwise and the block consisting of the —(OC₃H₆) groups is bound to a COO group or are HO—(C₃H₆), and preferably are independently of one another H₃C—(OC₂H₄)ₙ—(OC₃H₆)ₘ,
n is based on a molar average a number of from 40 to 50,
m is based on a molar average a number of from 1 to 7, and
a is based on a molar average a number of from 4 to 9.

In the inventive polyesters variable "a" based on a molar average preferably is a number of from 5 to 8 and more preferably is a number of from 6 to 7.

In the inventive polyesters variable "m" based on a molar average preferably is a number of from 2 to 5.

In the inventive polyesters variable "n" based on a molar average preferably is a number of from 43 to 47, more preferably is a number of from 44 to 46 and even more preferably is 45.

In one particularly preferred embodiment of the invention the inventive polyesters are according to the following formula (I)

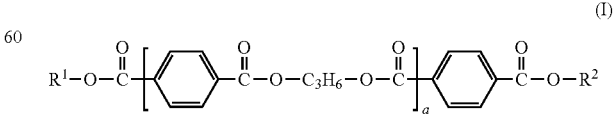

wherein
R¹ and R² independently of one another are H₃C—(OC₂H₄)ₙ—(OC₃H₆)ₘ wherein the —(OC₂H₄) groups and the —(OC$_3$H$_6$) groups are arranged blockwise and the block consisting of the —(OC$_3$H$_6$) groups is bound to a COO group, n is based on a molar average a number of from 44 to 46, m is based on a molar average 2, and a is based on a molar average a number of from 5 to 8.

Among these polyesters the polyesters according to formula (I)

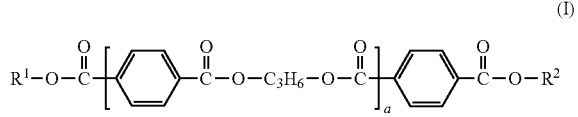

(I)

wherein

R$^1$ and R$^2$ independently of one another are H$_3$C—(OC$_2$H$_4$)$_n$—(OC$_3$H$_6$)$_m$ wherein the —(OC$_2$H$_4$) groups and the —(OC$_3$H$_6$) groups are arranged blockwise and the block consisting of the —(OC$_3$H$_6$) groups is bound to a COO group, n is based on a molar average 45, m is based on a molar average 2, and a is based on a molar average a number of from 6 to 7 are especially preferred.

In another particularly preferred embodiment of the invention the inventive polyesters are according to the following formula (I)

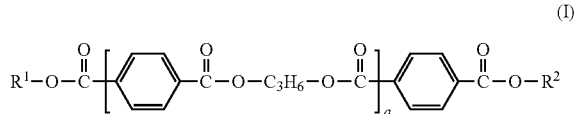

(I)

wherein

R$^1$ and R$^2$ independently of one another are H$_3$C—(OC$_2$H$_4$)$_n$—(OC$_3$H$_6$)$_m$ wherein the —(OC$_2$H$_4$) groups and the —(OC$_3$H$_6$) groups are arranged blockwise and the block consisting of the —(OC$_3$H$_6$) groups is bound to a COO group, n is based on a molar average a number of from 44 to 46, m is based on a molar average 5, and a is based on a molar average a number of from 5 to 8.

Among these polyesters the polyesters according to formula (I)

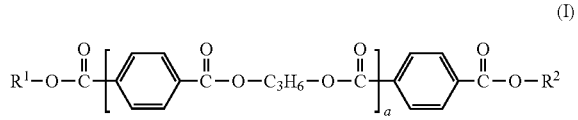

(I)

wherein

R$^1$ and R$^2$ independently of one another are H$_3$C—(OC$_2$H$_4$)$_n$—(OC$_3$H$_6$)$_m$ wherein the —(OC$_2$H$_4$) groups and the —(OC$_3$H$_6$) groups are arranged blockwise and the block consisting of the —(OC$_3$H$_6$) groups is bound to a COO group, n is based on a molar average 45, m is based on a molar average 5, and a is based on a molar average a number of from 6 to 7 are especially preferred.

The groups —O—C$_2$H$_4$— in the structural units "X—(OC$_2$H$_4$)$_n$—(OC$_3$H$_6$)$_m$" or "H$_3$C—(OC$_2$H$_4$)$_n$—(OC$_3$H$_6$)$_m$" are of the formula —O—CH$_2$—CH$_2$—.

The groups —O—C$_3$H$_6$— in the structural units indexed with "a", in the structural units "X—(OC$_2$H$_4$)$_n$—(OC$_3$H$_6$)$_m$" or "H$_3$C—(OC$_2$H$_4$)$_n$—(OC$_3$H$_6$)$_m$" and in the structural units HO—(C$_3$H$_6$) are of the formula —O—CH(CH$_3$)—CH$_2$— or —O—CH$_2$—CH(CH$_3$)—, i.e. are of the formula

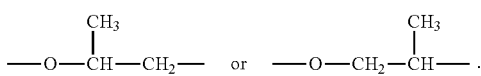

The inventive polyesters may be used in substance, i.e. as such, but may also be provided as aqueous solutions. The aqueous solutions are e.g. beneficial with respect to their handling and e.g. the metering of the inventive polyester is very easy. Preferably, the aqueous solutions comprise the inventive polyesters in an amount of from 25 to 70 weight-% based on the total mass of the aqueous solution.

Therefore, a further subject matter of the invention is an aqueous solution comprising an inventive polyester in an amount of from 25 to 70 weight-% based on the total mass of the aqueous solution. These aqueous solutions may even consist of the inventive polyester and water.

The inventive polyesters may advantageously be used in washing or laundry detergent compositions. Besides the inventive polyesters these washing or laundry detergent compositions may comprise one or more optional ingredients, e.g. they may comprise conventional ingredients commonly used in laundry detergent compositions. Examples of optional ingredients include, but are not limited to builders, surfactants, bleaching agents, bleach active compounds, bleach activators, bleach catalysts, photobleaches, dye transfer inhibitors, color protection agents, anti-redeposition agents, dispersing agents, fabric softening and antistatic agents, fluorescent whitening agents, enzymes, enzyme stabilizing agents, foam regulators, defoamers, malodour reducers, preservatives, disinfecting agents, hydrotopes, fibre lubricants, anti-shrinkage agents, buffers, fragrances, processing aids, colorants, dyes, pigments, anti-corrosion agents, fillers, stabilizers and other conventional ingredients for washing or laundry detergent compositions.

The inventive polyesters have an advantageous stability in alkaline environment, possess a beneficial solubility and advantageously are clearly soluble in alkaline compositions such as heavy duty washing liquids and also possess advantageous soil release properties. In washing or laundry detergent compositions they result in a beneficial washing performance, in particular also after storage. Furthermore, the inventive polyesters possess advantageous foam suppressing properties. This is not only advantageous when the washing or laundry detergent compositions comprising the inventive polyesters are applied but also advantageously reduces foaming during handling of the inventive polyesters.

The inventive polyesters may advantageously be prepared by a process which comprises heating dimethyl terephthalate (DMT), 1,2-propylene glycol (PG), and X—(OC$_2$H$_4$)$_n$—(OC$_3$H$_6$)$_m$—OH, wherein X is C$_{1-4}$ alkyl and preferably methyl, the —(OC$_2$H$_4$) groups and the —(OC$_3$H$_6$) groups are arranged blockwise and the block consisting of the —(OC$_3$H$_6$) groups is bound to the hydroxyl group —OH and n and m are as defined for the inventive polyesters, with the addition of a catalyst, to temperatures of from 160 to 220° C., firstly at atmospheric pressure, and then continuing the reaction under reduced pressure at temperatures of from 160 to 240° C.

Therefore, a further subject matter of the invention is a process for the preparation of the inventive polyesters which comprises heating dimethyl terephthalate (DMT), 1,2-propylene glycol (PG), and X—$(OC_2H_4)_n$—$(OC_3H_6)_m$—OH, wherein X is $C_{1-4}$ alkyl and preferably methyl, the —$(OC_2H_4)$ groups and the —$(OC_3H_6)$ groups are arranged blockwise and the block consisting of the —$(OC_3H_6)$ groups is bound to the hydroxyl group —OH and n and m are as defined for the inventive polyesters, with the addition of a catalyst, to temperatures of from 160 to 220° C., firstly at atmospheric pressure, and then continuing the reaction under reduced pressure at temperatures of from 160 to 240° C.

Reduced pressure preferably means a pressure of from 0.1 to 900 mbar and more preferably a pressure of from 0.5 to 500 mbar.

In a preferred embodiment of the invention the inventive process is characterized in that a) dimethyl therephthalate, 1,2-propylene glycol, X—$(OC_2H_4)_n$—$(OC_3H_6)_m$—OH, wherein X is $C_{1-4}$ alkyl and preferably methyl, and a catalyst are added to a reaction vessel, heated under inert gas, preferably nitrogen, to a temperature of from 160° C. to 220° C. to remove methanol and then pressure is reduced to below atmospheric pressure, preferably to a pressure of from 200 to 900 mbar and more preferably to a pressure of from 400 to 600 mbar for completion of the transesterification, and b) in a second step the reaction is continued at a temperature of from 210° C. to 240° C. and at a pressure of from 0.1 to 10 mbar and preferably of from 0.5 to 5 mbar to form the polyester.

Sodium acetate (NaOAc) and tetraisopropyl orthotitanate (IPT) is preferably used as the catalyst system in the inventive process.

The examples below are intended to illustrate the invention in detail without, however, limiting it thereto. Unless explicitly stated otherwise, all percentages given are percentages by weight (% by wt. or wt.-%).

General Procedure for the Preparation of the Polyesters of the Examples

The polyester synthesis is carried out by the reaction of dimethyl terephthalate (DMT), 1,2-propylene glycol (PG), and methyl polyalkyleneglycol using sodium acetate (NaOAc) and tetraisopropyl orthotitanate (IPT) as the catalyst system. The synthesis is a two-step procedure. The first step is a transesterification and the second step is a polycondensation.

Transesterification

Dimethyl terephthalate (DMT), 1,2-propylene glycol (PG), methyl polyalkyleneglycol, sodium acetate (anhydrous) (NaOAc) and tetraisopropyl orthotitanate (IPT) are weighed into a reaction vessel at room temperature.

For the melting process and homogenization, the mixture is heated up to 170° C. for 1 h and then up to 210° C. for a further 1 h sparged by a nitrogen stream. During the transesterification methanol is released from the reaction and is distilled out of the system (distillation temperature<55° C.). After 2 h at 210° C. nitrogen is switched off and the pressure is reduced to 400 mbar over 3 h.

Polycondenzation

The mixture is heated up to 230° C. At 230° C. the pressure is reduced to 1 mbar over 160 min. Once the polycondenzation reaction has started, 1,2-propylene glycol is distilled out of the system. The mixture is stirred for 4 h at 230° C. and a pressure of 1 mbar. The reaction mixture is cooled down to 140-150° C. Vacuum is released with nitrogen and the molten polymer is transferred into a glass bottle.

Example I

| Amount [g] | Amount [mol] | Raw Material [Abbreviation] |
|---|---|---|
| 101.95 | 0.53 | DMT |
| 84.0 | 1.104 | PG |
| 343.5 | 0.15 | $H_3C$—$(OC_2H_4)_{45}$—$(OC_3H_6)_5$—OH |
| 0.5 | 0.0061 | NaOAc |
| 0.2 | 0.0007 | IPT |

An inventive polyester according to formula (I) is obtained wherein $R^1$ and $R^2$ are $H_3C$—$(OC_2H_4)_n$—$(OC_3H_6)_m$ wherein the —$(OC_2H_4)$ groups and the —$(OC_3H_6)$ groups are arranged blockwise and the block consisting of the —$(OC_3H_6)$ groups is bound to a COO group, n is based on a molar average 45, m is based on a molar average 5, and a is based on a molar average a number of from 6 to 7.

Example II

| Amount [g] | Amount [mol] | Raw Material [Abbreviation] |
|---|---|---|
| 101.95 | 0.53 | DMT |
| 84.0 | 1.104 | PG |
| 317.4 | 0.15 | $H_3C$—$(OC_2H_4)_{45}$—$(OC_3H_6)_2$—OH |
| 0.5 | 0.0061 | NaOAc |
| 0.2 | 0.0007 | IPT |

An inventive polyester according to formula (I) is obtained wherein $R^1$ and $R^2$ are $H_3C$—$(OC_2H_4)$—$(OC_3H_6)_m$ wherein the —$(OC_2H_4)$ groups and the —$(OC_3H_6)$ groups are arranged blockwise and the block consisting of the —$(OC_3H_6)$ groups is bound to a COO group, n is based on a molar average 45, m is based on a molar average 2, and a is based on a molar average a number of from 6 to 7.

Example III

Comparative Example

| Amount [g] | Amount [mol] | Raw Material [Abbreviation] |
|---|---|---|
| 44.7 | 0.23 | DMT |
| 38 | 0.50 | PG |
| 301.1 | 0.14 | $H_3C$—$(OC_2H_4)_{45}$—$(OC_3H_6)_2$—OH |
| 0.5 | 0.0061 | NaOAc |
| 0.2 | 0.0007 | IPT |

A comparative polyester of formula (I') is obtained

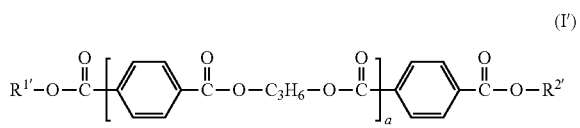

wherein
$R^{1'}$ and $R^{2'}$ are $H_3C-(OC_2H_4)_{n'}-(OC_3H_6)_{m'}$, wherein the $-(OC_2H_4)$ groups and the $-(OC_3H_6)$ groups are arranged blockwise and the block consisting of the $-(OC_3H_6)$ groups is bound to a COO group,
n' based on a molar average is 45,
m' based on a molar average is 2, and
a is based on a molar average a number of from 2 to 3.

Example IV

Comparative Example

| Amount [g] | Amount [mol] | Raw Material [Abbreviation] |
|---|---|---|
| 101.95 | 0.53 | DMT |
| 84.0 | 1.1 | PG |
| 206.0 | 0.1 | $H_3C-(OC_2H_4)_{45}-(OC_3H_6)_2-OH$ |
| 0.5 | 0.0061 | NaOAc |
| 0.2 | 0.0007 | IPT |

A comparative polyester of formula (I') is obtained

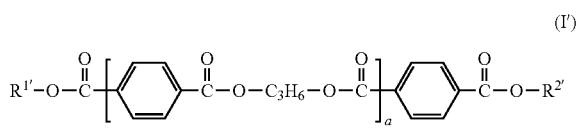

wherein
$R^{1'}$ and $R^{2'}$ are $H_3C-(OC_2H_4)_{n'}-(OC_3H_6)_{m'}$, wherein the $-(OC_2H_4)$ groups and the $-(OC_3H_6)$ groups are arranged blockwise and the block consisting of the $-(OC_3H_6)$ groups is bound to a COO group,
n' based on a molar average is 45,
m' based on a molar average is 2, and
a based on a molar average is a number of approximately 10.

Stability Test in Detergent Formulation 1 wt.-% (based on the total weight of the detergent formulation) of the polyesters of Examples I to IV and of the commercially available soil release polymer "TexCare SRN100" was used in a detergent formulation (the composition of the detergent formulations is given in Table A below) and the pH value was set with caustic to pH 8.2. The turbidity of the 5 formulations was determined. The prepared formulations were stored at 60° C. for 8 days. Afterwards, the hydrolysis of the polyesters was determined and compared to the hydrolysis of the commercially available soil release polymer "TexCare SRN100" by GPC analysis. The results are given in Table B below.

TexCare SRN100 is a polyester comprising $-OOC-(1,4$-phenylene$)-COO-$ structural units and $-O-CH_2CH_2-O-$ structural units.

TABLE A

| Detergent formulation | |
|---|---|
| Ingredient | wt.-% |
| MPG | 15.00 |
| TEA | 4.18 |
| NI 7EO | 7.28 |
| LAS acid | 4.85 |
| SLES 3EO | 2.42 |
| Empigen ® BB | 0.86 |
| Prifac 5908 | 0.86 |
| EPEI | 3.14 |
| Perfume | 1.39 |
| Polyester (selected from the polyesters of Examples I to IV and TexCare SRN100) | 1.00 |
| Demineralized water and NaOH to adjust to pH 8.2 | ad 100 |

Key to ingredients used:

MPG is mono propylene glycol.

TEA is triethanolamine.

NI 7EO is $C_{12-15}$ alcohol ethoxylate 7EO nonionic Neodol® 25-7 (ex Shell Chemicals).

LAS acid is $C_{12-14}$ linear alkylbenzene sulphonic acid.

SLES 3EO is sodium lauryl ether sulphate with 3 moles EO.

Empigen® BB is Cocobetaine ex Huntsman.

Prifac® 5908 is saturated lauric fatty acid ex Croda.

EPEI is Sokalan HP20—ethoxylated polyethylene imine cleaning polymer: PEI(600) 20EO ex BASF.

Perfume is free oil perfume.

TexCare SRN100 is soil release polymer ex Clariant.

TABLE B

| Turbidity of formulation comprising polyester and stability of polyester therein | | |
|---|---|---|
| Polyester | Turbidity | Degree of Hydrolysis |
| TexCare SRN100 | clearly soluble | 100% |
| Example I (inventive) | clearly soluble | 45% |
| Example II (inventive) | clearly soluble | 48% |
| Example III (comparative) | clearly soluble | 72% |
| Example IV (comparative) | turbid | 42% |

%-values for polyesters of Examples I to IV in comparison/relation to TexCare SRN100.

Soil Release Test:

The polyesters of Examples I and II were tested for their soil release performance according to the "Dirty-Motor Oil" Test (DMO-Test).

The polyesters of Examples I and II were used in concentrations of 1 wt.-% (based on the total weight of the detergent formulation used) and the formulations were stored according to the stability test. The formulations were those described above for the stability test. As test fabric a white polyester standard fabric (30A) was used. The prewashed fabrics (the fabrics were prewashed with the stored detergent formulations comprising the polyesters of Examples I and II) were soiled with dirty motor oil. After 1 h the soiled fabrics were washed again with the stored detergent formulations comprising the polyesters of Examples I and II. The washing conditions for the "prewash" and for the washing procedure after soiling with dirty motor oil were as given in Table C.

TABLE C

| Washing conditions | |
|---|---|
| Washing machine | Linitest |
| Hardness of water | 15 °H |
| Washing temperature | 40° C. |
| Washing time | 30 min |
| Detergent concentration | 6 g/L |

The washing results obtained for the stored formulations comprising the polyesters of Examples I and II are shown in Table D. Table D also shows the washing result obtained for a detergent formulation comprising 1 wt.-% of TexCare SRN100. The composition of this detergent formulation comprising TexCare SRN100 was as described above for the stability test. In case of TexCare SRN100 the conditions for the "prewash" and for the washing procedure after soiling were similar to the conditions used for the detergent formulations comprising the polyesters of Examples I and II but with the exception that in case of TexCare SRN100 the "prewash" and the washing procedure after the soiling of the fabrics with dirty motor oil was done using "fresh" detergent formulation (no alkaline storage).

TABLE D

Test results (washing performance)

| Polyester | results for "fresh" formulation or after storage | Washing Performance |
|---|---|---|
| TexCare SRN100 | fresh | 100% |
| Example I | after storage | 96% |
| Example II | after storage | 107% |

The present invention resulted from work undertaken under a joint research agreement between Clariant International Ltd. and Unilever UK Central Resources Limited in the field of polyester soil release polymers and their uses in detergent compositions.

The invention claimed is:

1. A polyester according to the following formula (I)

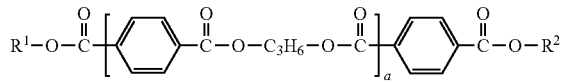

(I)

wherein
R$^1$ and R$^2$ independently of one another are X—(OC$_2$H$_4$)$_n$—(OC$_3$H$_6$)$_m$ wherein X is C$_{1-4}$ alkyl, the —(OC$_2$H$_4$) groups and the —(OC$_3$H$_6$) groups are arranged blockwise and the block consisting of the —(OC$_3$H$_6$) groups is bound to a COO group,
n is a number of from 40 to 50,
m is a number of from 1 to 10, and
a is a number of from 5 to 8 and
wherein n, m, and a are based on a molar average.

2. The polyester according to claim 1, wherein
R$^1$ and R$^2$ independently of one another are H$_3$C—(OC$_2$H$_4$)$_n$—(OC$_3$H$_6$)$_m$ wherein the —(OC$_2$H$_4$) groups and the —(OC$_3$H$_6$) groups are arranged blockwise and the block consisting of the —(OC$_3$H$_6$) groups is bound to a COO group,
n is a number of from 40 to 50,
m is a number of from 1 to 7, and
a is a number of from 5 to 8.

3. The polyester according to claim 1, wherein a is a number of from 6 to 7.

4. The polyester according to claim 1, wherein m is a number of from 2 to 5.

5. The polyester according to claim 1, wherein n is a number of from 43 to 47.

6. The polyester according to claim 5, wherein n is a number of from 44 to 46.

7. The polyester according to claim 6, wherein n is 45.

8. The polyester according to claim 1, wherein
R$^1$ and R$^2$ independently of one another are H$_3$C—(OC$_2$H$_4$)$_n$—(OC$_3$H$_6$)$_m$ wherein the —(OC$_2$H$_4$) groups and the —(OC$_3$H$_6$) groups are arranged blockwise and the block consisting of the —(OC$_3$H$_6$) groups is bound to a COO group,
n is a number of from 44 to 46,
m is 2, and
a is a number of from 5 to 8.

9. The polyester according to claim 8, wherein n is 45, and a is a number of from 6 to 7.

10. The polyester according to claim 1, wherein
R$^1$ and R$^2$ independently of one another are H$_3$C—(OC$_2$H$_4$)$_n$—(OC$_3$H$_6$)$_m$ wherein the —(OC$_2$H$_4$) groups and the —(OC$_3$H$_6$) groups are arranged blockwise and the block consisting of the —(OC$_3$H$_6$) groups is bound to a COO group,
n is a number of from 44 to 46,
m is 5, and
a is a number of from 5 to 8.

11. The polyester according to claim 10, wherein n is 45, and a is a number of from 6 to 7.

12. A process for the preparation of a polyester according to claim 1, comprising the step of heating dimethyl terephthalate, 1,2-propylene glycol, and X—(OC$_2$H$_4$)$_n$—(OC$_3$H$_6$)$_m$—OH, wherein X is C$_{1-4}$ alkyl and preferably methyl, the —(OC$_2$H$_4$) groups and the —(OC$_3$H$_6$) groups are arranged blockwise and the block consisting of the —(OC$_3$H$_6$) groups is bound to the hydroxyl group —OH and n and m are as defined in claim 1, with the addition of a catalyst, to temperatures of from 160 to 220° C., firstly at atmospheric pressure, and then continuing the reaction under reduced pressure at temperatures of from 160 to 240° C.

* * * * *